United States Patent
Bransford et al.

(10) Patent No.: US 8,179,694 B2
(45) Date of Patent: May 15, 2012

(54) MAGNETIC INDUCTION GRID AS AN EARLY WARNING MECHANISM FOR SPACE BASED MICROELECTRONICS

(75) Inventors: Mark A. Bransford, Rochester, MN (US); Jack A. Mandelman, Flat Rock, NC (US)

(73) Assignee: International Business Machines Corporation, Armonk, NY (US)

( * ) Notice: Subject to any disclaimer, the term of this patent is extended or adjusted under 35 U.S.C. 154(b) by 1097 days.

(21) Appl. No.: 12/048,244

(22) Filed: Mar. 14, 2008

(65) Prior Publication Data

US 2009/0231771 A1 Sep. 17, 2009

(51) Int. Cl.
*H05K 9/00* (2006.01)

(52) U.S. Cl. ........................ 361/816; 174/350

(58) Field of Classification Search ............ 378/95; 327/509; 250/370; 361/816
See application file for complete search history.

(56) References Cited

U.S. PATENT DOCUMENTS

| | | | | |
|---|---|---|---|---|
| 5,079,532 A | * | 1/1992 | Bonanos | 335/213 |
| 7,057,180 B2 | * | 6/2006 | Fifield et al. | 250/370.02 |
| 7,166,847 B2 | * | 1/2007 | Hannah | 250/370.01 |
| 7,309,866 B2 | * | 12/2007 | Hannah | 250/370.14 |
| 7,863,571 B2 | * | 1/2011 | Beken | 250/358.1 |
| 7,945,105 B1 | * | 5/2011 | Jaenisch | 382/249 |
| 2008/0315091 A1 | * | 12/2008 | Morris et al. | 250/307 |
| 2009/0057565 A1 | * | 3/2009 | Hannah | 250/370.14 |
| 2010/0032564 A1 | * | 2/2010 | Morris et al. | 250/307 |
| 2010/0065745 A1 | * | 3/2010 | Goldberg et al. | 250/358.1 |

OTHER PUBLICATIONS

V.M. Kartashev, et al., Possibility to detect cosmic particles and nutrino of super-high evergies in atmospheric air and condensed media using magnetoinductive method, Apr. 20, 2004, Journal of Kharkiv University, No. 628, 2004, 628_2(24)_04_p23-34.*

* cited by examiner

*Primary Examiner* — Dameon Levi
*Assistant Examiner* — Theron Milliser
(74) *Attorney, Agent, or Firm* — Bockhop & Associates LLC

(57) ABSTRACT

A system for protecting an electronic device from cosmic rays includes a frame in which the circuit is disposed, a cosmic ray detection circuit and a protection circuit. The cosmic ray detection circuit is supported by the frame and is spaced apart from the circuit. The cosmic ray detection circuit is configured to assert an incoming cosmic ray signal when a cosmic ray interacts with the cosmic ray detection device. The protection circuit is coupled to the incoming cosmic ray signal and is configured to cause the electronic device to enter a protected state when the cosmic ray signal is asserted.

20 Claims, 3 Drawing Sheets

MAGNETIC INDUCTION GRID AS AN EARLY WARNING MECHANISM FOR SPACE BASED MICROELECTRONICS

BACKGROUND OF THE INVENTION

1. Field of the Invention

The present invention relates to error prevention devices and, more specifically, to a device that prevents errors due to cosmic rays.

2. Description of the Prior Art

Microelectronic devices operated in space and high altitudes are typically subjected to a barrage of charged particles that often strip electrons or the create electron/hole pairs. Such interference can result in signal spikes, noise, and single-effect events (SEE). SEEs can have a significant impact on digital devices.

When a high-energy particle travels through a semiconductor, it leaves an ionized track behind. This ionization may cause a highly localized effect such as a benign glitch in output, a less benign bit flip in memory or a register, or (especially in high-power transistors) a destructive latch-up and burnout. Single event effects can be disruptive in satellites, aircraft, and other aerospace applications (both civilian and military).

There are several different types of SEE, including: (1) Single-event upsets (SEU), or transient radiation effects in electronics, are state changes of memory or register bits caused by a single ion interacting with a circuit. Generally, they do not cause lasting damage. However, in very sensitive devices a single ion can cause a multiple-bit upset (MBU) in several adjacent memory cells. SEUs can result in single-event functional interrupts (SEFI) when they cause a device to enter into an undefined state, a test mode, or a halt, each of which require a reset or a power cycle for a recovery. (2) Single-event latch-up (SEL) can occur in any chip with a parasitic PNPN structure. A heavy ion or a high-energy proton passing through one of the two inner-transistor junctions can open the thyristor-like structure, which then stays opened (an effect known as latch-up) until the device is power-cycled. As the effect occurs between the power source and the substrate, destructively high current can be involved and the part may fail. Bulk CMOS devices are most susceptible to this type of SEE. (3) Single-event transient (SET) occurs when the charge collected from an ionization event discharges in the form of a spurious signal traveling through the circuit. This corresponds to the effect of an electrostatic discharge. (4) Single-event snapback, similar to SEL but not requiring the PNPN structure, can be induced in N-channel MOS transistors switching large currents. When an ion hits near the drain junction, it can cause avalanche multiplication of the charge carriers. The transistor then opens and stays opened. (5) Single-event induced burnout (SEB) may occur in power MOSFETs when the substrate right under the source region gets forward-biased and the drain-source voltage is higher than the breakdown voltage of the parasitic structures. The resulting high current and local overheating then may destroy the device. (6) Single-event gate rupture (SEGR) may be observed in power MOSFETs when a heavy ion hits the gate region while a high voltage is applied to the gate. A local breakdown then occurs in the insulating layer of silicon dioxide, causing local overheat and destruction (looking like a microscopic explosion) of the gate region. It can occur in EEPROM cells during write or erase, when the cells are subjected to a comparatively high voltage.

The electronics industry has focused on protecting space born circuitry, such as memory (e.g. SRAM/DRAM), from the affects of SEE through use of radiation hardened (sometimes referred to as "RAD hard" circuitry). RAD hard circuitry uses both physical protection schemes and logical protection schemes. Typical physical protection schemes employ shielding, insulation and use of high band gap substrates to prevent SEEs. Typical logical protection schemes include redundancy and error detection and recovery schemes to mitigate the effects of SEEs.

A soft error is any error occurrence in a computer's memory system that changes an instruction in a program or a data value. A soft error will not damage a system's hardware; the only damage is to the data that is being processed. If detected, a soft error may be corrected by rewriting correct data in place of erroneous data. Highly reliable systems use error correction to correct soft errors as they occur. However, in many systems, it may be impossible to determine the correct data, or even to discover that an error is present at all. In addition, before the correction can occur, the system may have crashed, in which case the recovery procedure must include a reboot. Rebooting a microprocessor, especially for very sensitive and mission critical applications that are typically running in satellites, is usually not desirable and sometimes not even feasible.

Existing systems involve significant overhead and are not always reliable. They also lack the ability to take temporary and local steps to prevent the consequences of an interfering event—steps that allow return to normal operation upon completion of the interfering event.

Therefore, there is a need for a circuit protection system that detects cosmic rays that are about to interact with a circuit and that takes protective action before such interaction.

SUMMARY OF THE INVENTION

The disadvantages of the prior art are overcome by the present invention which, in one aspect, is a system for protecting an electronic device from cosmic rays that includes a frame in which the circuit is disposed, a cosmic ray detection circuit and a protection circuit. The cosmic ray detection circuit is supported by the frame and is spaced apart from the circuit. The cosmic ray detection circuit is configured to assert an incoming cosmic ray signal when a cosmic ray interacts with the cosmic ray detection device. The protection circuit is coupled to the incoming cosmic ray signal and is configured to cause the electronic device to enter a protected state when the cosmic ray signal is asserted.

In another aspect, the invention is an electronic system suitable for exposure to a cosmic ray environment that includes an electronic device, a first array of spaced apart coils, a current detector circuit and a controller. The first array of spaced apart coils is spaced apart from the electronic device. Each coil is configured to generate a current when a cosmic ray interacts with the coil. The current detector circuit detects current generated in a coil of the plurality of coils. The controller is configured to drive the electronic device into a preselected state when the current detector detects a current.

In yet another aspect, the invention is a method of protecting an electronic device, in which a cosmic ray having a trajectory toward the electronic device is sensed. The circuit into a preselected state is driven when the cosmic ray has a trajectory toward the electronic device.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
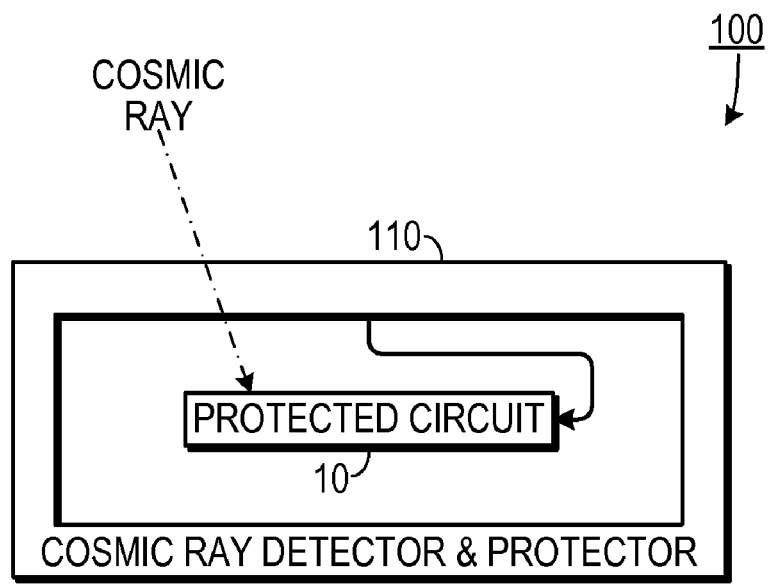
FIG. 1 is a schematic diagram of one embodiment of a cosmic ray detection and protection circuit.
Figure 2:
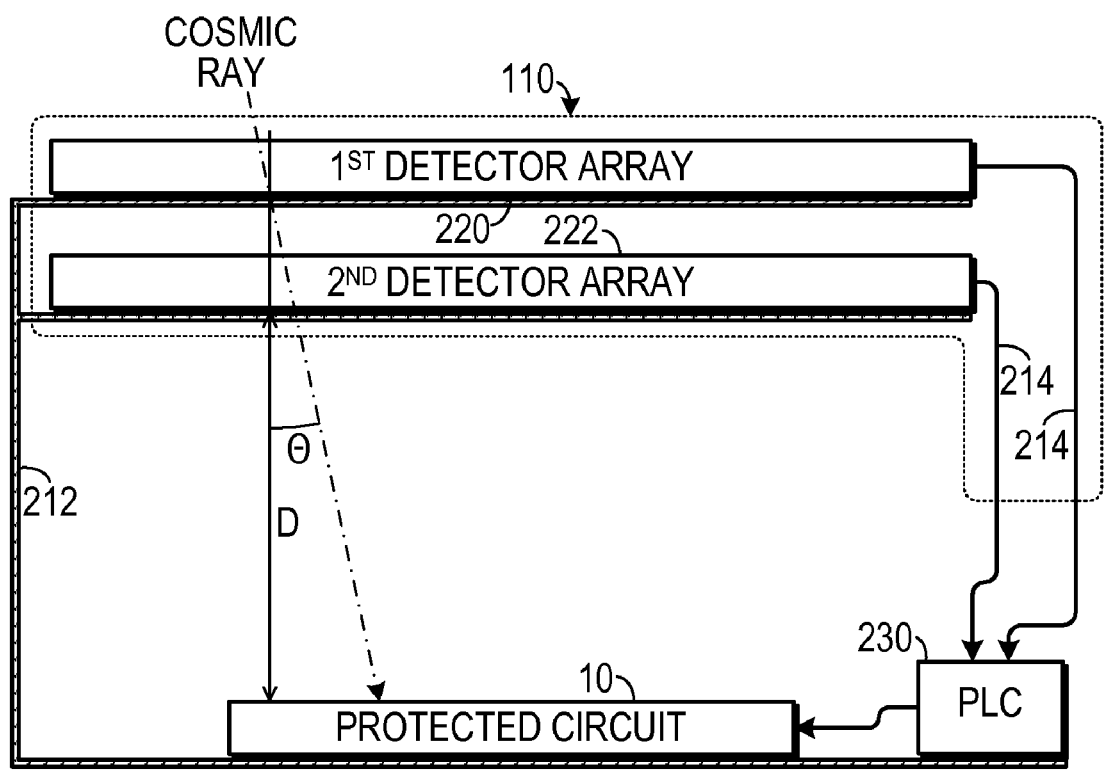
FIG. 2 is a schematic diagram of a cosmic ray detection and protection circuit employing two detector arrays.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Also, as used herein "cosmic ray" includes any electromagnetic interference in motion (including a charged particle) that is capable of interfering with the operation of an electronic circuit.

As shown in FIG. 1, one embodiment of an electronic system 100 suitable for exposure to a cosmic ray environment includes an electronic device 10, such as a microelectronic circuit. A cosmic ray detector and protection circuit 110 detects an incoming cosmic ray and causes the electronic system to take protective action when a cosmic ray is detected.

One embodiment of cosmic ray detector and protection circuit 110 includes a first cosmic ray detection circuit array 220 and a spaced apart second cosmic detection circuit array 222, both supported by a frame 212. The first cosmic ray detection circuit array 220 and the second cosmic detection circuit array 222 each generate a cosmic ray signal 214 when a cosmic ray interacts with the first cosmic ray detection circuit array 220 and the second cosmic ray detection circuit array 222. Use of two separate cosmic ray detection circuit arrays allows for a precise determination of where on the electronic device 10 the cosmic ray is likely to impact. To make this determination, the first cosmic ray detection circuit array 220 indicates through where on the first array 220 the cosmic ray has passed and the second cosmic detection circuit array 222 does the same. The trajectory of the cosmic ray is then calculated based on the times the cosmic ray intersects with the arrays and the positions of intersection. The trajectory is then interpolated onto the electronic device 10. (One embodiment, employing only a single array of cosmic ray detectors, would not provide a precise geometric location of the point of impact, but would be able to indicate that a cosmic ray is approaching the electronic device 10.)

When an incoming cosmic ray is detected, a controller 230 (such as a programmable logic controller or logic array) senses the assertion of the cosmic ray signals 214, calculates the location of impact and then generates a signal that causes the electronic device 110 to enter a protected state. Such a signal could take the form of an interrupt that causes the electronic device 10 to execute a protection routine. For example, the electronic device 10 could be caused to store data representative of its current state in a robust memory and then go dormant for a preselected period of time.

Figure 3:
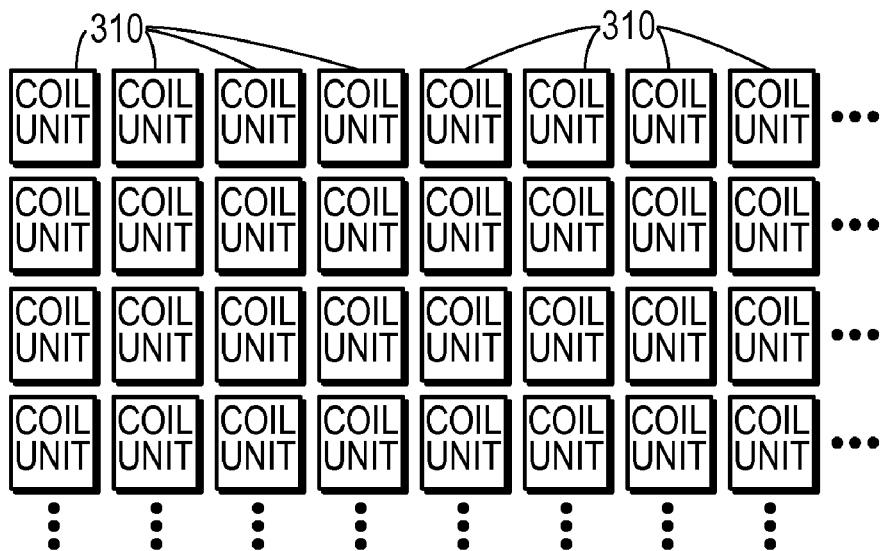
FIG. 3 is a schematic diagram of an array of coil units.
Figure 4:
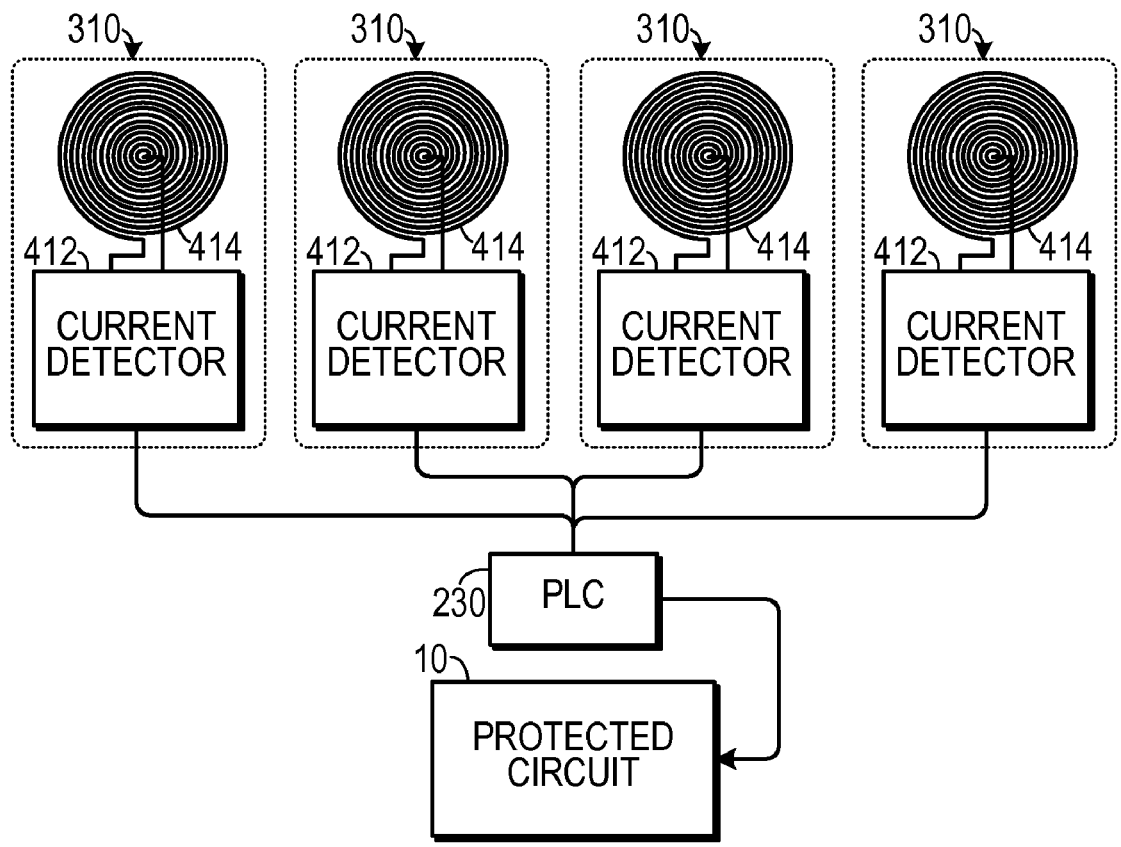
FIG. 4 is a schematic diagram of several coil units and a controller.

As shown in FIGS. 3 and 4, the detection circuit arrays each include an array of coil units 310, which each include a coil 414 and an associated current detector 412. A cosmic ray passing near a coil 414 induces a current in the coil 414, which is detected by the current detector 412. The coils 414 need a sufficient number of windings to generate a detectable current when interacting with a cosmic ray and may be made using known photolithography techniques to print them onto a two dimensional surface of a substrate. The current detector 412 could be something as simple as a differential amplifier with the two ends of the coil 414 connected thereto as inputs.

Figure 5:
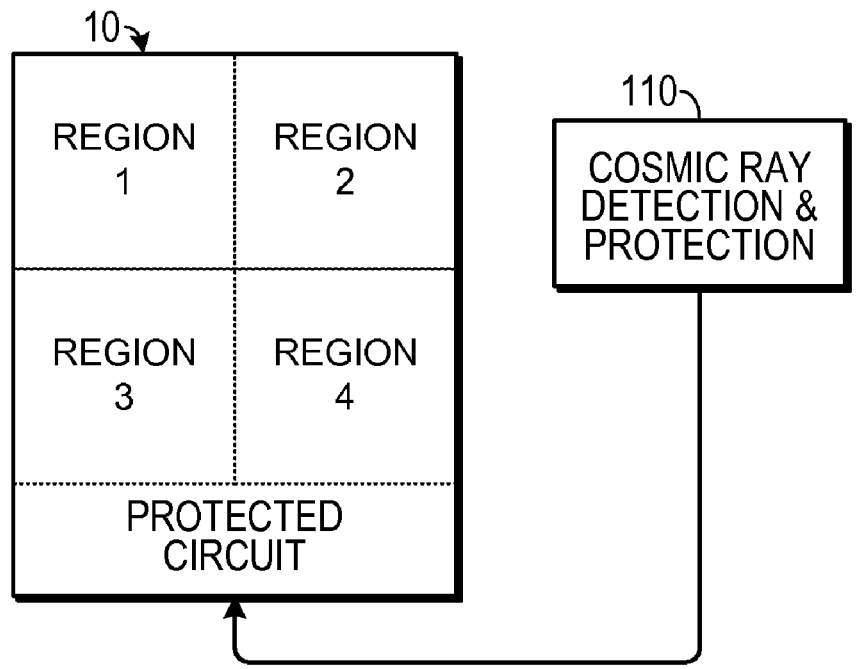
FIG. 5 is a schematic diagram of a protected circuit.

As shown in FIG. 5, the electronic device 10 may be divided into a plurality of different regions. When a cosmic ray is approaching a first region (e.g., Region 1, as shown in FIG. 5), then the device 10 can cause data from the affected region to be copied to registers in another region (e.g., to Region 2) prior to interacting with the cosmic ray. The first region is then driven into a dormant state and remains dormant until the cosmic ray has passed. After the cosmic ray has passed, the data from the registers in the second region are copied back to the first region and normal operation of the electronic device resumes.

Figure 6:
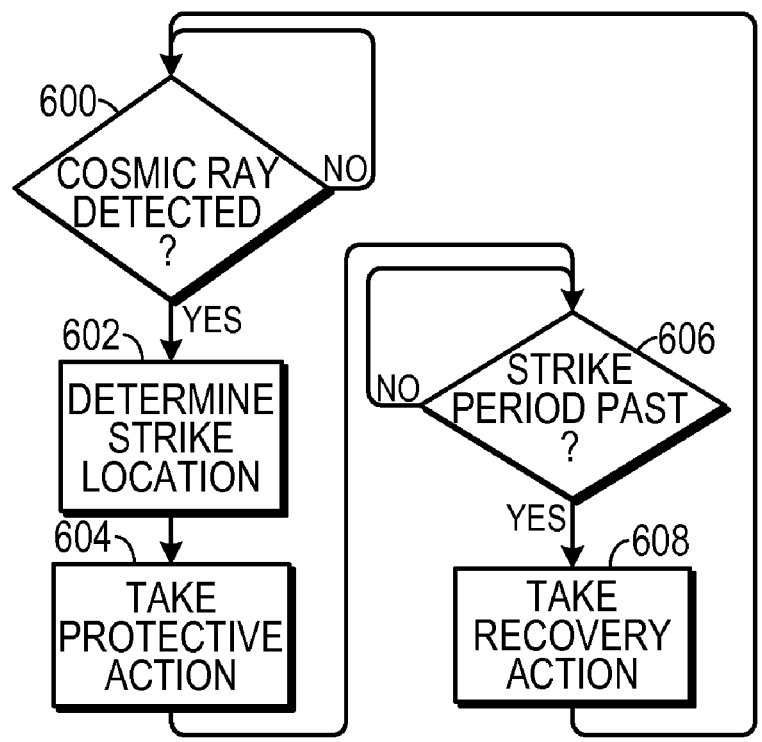
FIG. 6 is a flowchart demonstrating a method of protecting a circuit.

As shown in FIG. 6, in one method for protecting a circuit from cosmic rays, a cosmic ray is first detected 600. The location of cosmic ray impact on the circuit is determined 602 and an action to protect the circuit is taken 604. After an amount of time corresponding to the cosmic ray no longer posing a danger to the circuit 606 the circuit executes a recovery routine 608 and normal operation of the circuit resumes.

The above described embodiments, while including the preferred embodiment and the best mode of the invention known to the inventor at the time of filing, are given as illustrative examples only. It will be readily appreciated that many deviations may be made from the specific embodiments disclosed in this specification without departing from the spirit and scope of the invention. Accordingly, the scope of the invention is to be determined by the claims below rather than being limited to the specifically described embodiments above.

What is claimed is:

1. A system for protecting an electronic device from cosmic rays, comprising:
   a. a frame in which the circuit is disposed;
   b. a cosmic ray detection circuit supported by the frame and spaced apart from the circuit and configured to assert an incoming cosmic ray signal when a cosmic ray interacts with the cosmic ray detection circuit; and
   c. a protection circuit, coupled to the incoming cosmic ray signal, that is configured to cause the electronic device to enter a protected state when the cosmic ray signal is asserted.

2. The system of claim 1, wherein the cosmic ray detection circuit comprises a first array of coils that each have a number of windings so that a current is generated within the coil when a cosmic ray passes within a predetermined proximity of the coil.

3. The system of claim 2, further comprising:
   a. a first plurality of current detector circuits, each of the first plurality of current detector circuits associated with one of the coils in the first array of coils and configured to detect a current induced in the coil; and
   b. a controller, responsive to each of the first plurality of current detector circuits that is configured to assert the incoming ray signal when one of the current detector circuits detects a current in a coil associated therewith.

4. The system of claim 2, further comprising a second array of coils, spaced apart from the first array of coils, that each have a number of windings so that a current is generated within the coil when a cosmic ray passes within a predetermined proximity of the coil.

5. The system of claim 4, further comprising a second plurality of current detector circuits, each of the second plurality of current detector circuits associated with one of the coils in the second array of coils and configured to detect a current induced in the coil.

6. The system of claim 5, wherein the electronic device includes a plurality of spaced apart regions and wherein the controller is responsive to each of the second plurality of detector circuits and wherein the controller is configured to:
   a. determine which of the plurality of spaced apart regions is a first region that the cosmic ray is most likely to interact with; and
   b. drive the first region into the preselected state.

7. The system of claim 6, wherein the controller is further configured to
   a. copy a preselected set of data from the first region into a second region of the plurality of spaced apart regions before the cosmic ray interacts with the first region; and
   b. copy the preselected set of data from the second region into the first region after the cosmic ray has interacted with the first region.

8. The system of claim 7, wherein, to determine which of the plurality of spaced apart regions is a first region that the cosmic ray is most likely to interact with, the controller is configured to:
   a. sense a first time that the cosmic ray passes through a first position;
   b. sense a second time, different from the first time, that the cosmic passes through a second position, spaced apart from the first position;
   c. calculate the trajectory of the cosmic ray based on the first time, the first position, the second time and the second position; and
   d. determine which of the spaced apart regions lies within the trajectory of the cosmic ray.

9. The system of claim 4, wherein the coils of the first array and the second array comprise coils that are printed on a two-dimensional surface.

10. An electronic system suitable for exposure to a cosmic ray environment, comprising:
    a. an electronic device;
    b. a first array of spaced apart coils that is spaced apart from the electronic device, each coil configured to generate a current when a cosmic ray interacts with the coil;
    c. a current detector circuit that detects current generated in a coil of the plurality of coils; and
    d. a controller that is configured to drive the electronic device into a preselected state when the current detector detects a current.

11. The electronic system of claim 10, further comprising a second array of spaced apart coils, the second array spaced apart from the first array, each coil configured to generate a current when a cosmic ray interacts with the coil, wherein the current detector is responsive to the second array of spaced apart coils.

12. The electronic system of claim 11, wherein the controller is configured to calculate a trajectory of a cosmic ray based on a time that the cosmic ray interacts with a first coil of the first array and a time that the cosmic ray interacts with a second coil of the second array.

13. The electronic system of claim 12, wherein the controller is further configured to drive a first region of the electronic device within the trajectory of the cosmic ray into a protected state when the cosmic ray is directed toward the first region.

14. The electronic system of claim 13, wherein the first region enters a protected state by copying a preselected set of data into a second region of the electronic device.

15. A method of protecting an electronic device, comprising the actions of:
    a. sensing a cosmic ray having a trajectory toward the electronic device; and
    b. driving the circuit into a preselected state when the cosmic ray has a trajectory toward the electronic device.

16. The method of claim 15, wherein the electronic device includes a plurality of spaced apart regions and wherein the sensing action includes the action of determining which of the plurality of spaced apart regions is a first region that the cosmic ray is most likely to interact with.

17. The method of claim 16, wherein the driving action includes driving the first region into the preselected state.

18. The method of claim 17, wherein the action of driving the circuit into a preselected state comprises the actions of:
    a. copying a preselected set of data from the first region into a second region of the plurality of spaced apart regions before the cosmic ray interacts with the first region; and
    b. copying the preselected set of data from the second region into the first region after the cosmic ray has interacted with the first region.

19. The method of claim 16, wherein the action of determining which of the plurality of spaced apart regions is a first region that the cosmic ray is most likely to interact with comprises:
    a. sensing a first time that the cosmic ray passes through a first position;
    b. sensing a second time, different from the first time, that the cosmic passes through a second position, spaced apart from the first position;
    c. calculating the trajectory of the cosmic ray based on the first time, the first position, the second time and the second position; and
    d. determining which of the spaced apart regions lies within the trajectory of the cosmic ray.

20. The method of claim 17, wherein the action of driving the circuit into a preselected state comprises the actions of:
    a. generating an interrupt when a cosmic ray is detected; and
    b. executing a routine corresponding to the interrupt when the interrupt is generated.

* * * * *